United States Patent
Houck et al.

(10) Patent No.: US 7,357,613 B2
(45) Date of Patent: Apr. 15, 2008

(54) EXPANSION ANCHOR WITH CRACK-ARRESTING GROOVE

(75) Inventors: Joel M. Houck, Lansing, IL (US); Gerald W. Hagel, Lombard, IL (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 11/341,402

(22) Filed: Jan. 26, 2006

(65) Prior Publication Data
US 2007/0172328 A1    Jul. 26, 2007

(51) Int. Cl.
*F16B 13/06* (2006.01)
(52) U.S. Cl. .................. 411/60.3; 411/72; 411/57.1
(58) Field of Classification Search ............. 411/57.1, 411/60.1–60.3, 71–73, 63, 58, 59, 29–31
See application file for complete search history.

(56) References Cited

U.S. PATENT DOCUMENTS

| | | |
|---|---|---|
| 2,033,100 A | 3/1936 | Kellogg |
| 3,911,782 A | 10/1975 | Liebig |
| 4,011,786 A | 3/1977 | Liebig |
| 4,019,420 A | 4/1977 | Fischer |
| 4,293,259 A | 10/1981 | Liebig |
| 4,315,708 A | 2/1982 | Liebig |
| 4,330,230 A | 5/1982 | Giannuzzi |
| 4,339,217 A | 7/1982 | Lacey |
| 4,411,324 A | 10/1983 | Liebig |
| 4,500,239 A | 2/1985 | Liebig |
| 4,519,735 A | 5/1985 | Machtle |
| 4,560,311 A | 12/1985 | Herbet et al. |
| 4,575,294 A | 3/1986 | Mermi et al. |
| 4,613,254 A | 9/1986 | Liebig |
| 4,636,123 A | 1/1987 | Herb |
| 4,678,383 A | 7/1987 | Bergner |
| 4,690,597 A | 9/1987 | Liebig |
| 4,692,076 A | 9/1987 | Herb |
| 4,702,654 A | 10/1987 | Frischmann et al. |
| 4,797,044 A | 1/1989 | Velasco |
| 4,929,134 A | 5/1990 | Bergner |
| 5,108,240 A | 4/1992 | Liebig |
| 5,176,481 A | 1/1993 | Schiefer |
| 5,263,803 A | 11/1993 | Anquetin |

(Continued)

FOREIGN PATENT DOCUMENTS

CA    2136020    9/1994

(Continued)

*Primary Examiner*—William L. Miller
(74) *Attorney, Agent, or Firm*—Charles R. Cypher; James R. Cypher

(57) ABSTRACT

An anchor is provided that is inserted into a bore in a cementious member, the bore having a side wall. A tensioning head is connected to the leading end of the stem and when the stem is moved the tensioning head moves with the stem. The outer surface of the tensioning head flares generally outwardly from the trailing end to the leading end of the tensioning head. The anchor also has an expansion sleeve, and the stem can move longitudinally through the expansion sleeve when the expansion sleeve is held in a fixed position, and the tensioning head pushes upon the expansion sleeve, causing it to flare outwardly. The expansion sleeve is provided with first and second grooves that assist the expansion sleeve in expanding without splitting.

14 Claims, 6 Drawing Sheets

U.S. PATENT DOCUMENTS

| | | |
|---|---|---|
| 5,342,157 A | 8/1994 | Fischer |
| 5,452,976 A | 9/1995 | Bayer et al. |
| 5,569,091 A | 10/1996 | Haage et al. |
| 5,707,190 A | 1/1998 | Hiraguri et al. |
| 5,746,557 A | 5/1998 | Kaibach |
| 5,772,372 A | 6/1998 | Lins et al. |
| 5,807,049 A | 9/1998 | Beck et al. |
| 5,813,808 A | 9/1998 | Wu |
| 5,816,760 A | 10/1998 | Mattner et al. |
| 5,911,550 A | 6/1999 | Popp et al. |
| 5,921,733 A | 7/1999 | Kaibach et al. |
| 5,941,668 A | 8/1999 | Kaibach et al. |
| 5,993,127 A | 11/1999 | Shinn |
| 5,993,128 A | 11/1999 | Mark et al. |
| 6,012,887 A | 1/2000 | Kaibach et al. |
| 6,027,292 A | 2/2000 | Raber |
| 6,074,145 A | 6/2000 | Kaibach et al. |
| 6,179,536 B1 * | 1/2001 | Belz et al. ............... 411/54.1 |
| 6,213,697 B1 | 4/2001 | Uejima |
| 6,457,922 B1 | 10/2002 | Tsai |
| 7,150,595 B2 * | 12/2006 | Liebig et al. ............... 411/60.3 |
| 2002/0054805 A1 | 5/2002 | Kaibach et al. |
| 2002/0106256 A1 | 8/2002 | Kaibach et al. |
| 2004/0253075 A1 | 12/2004 | Liebig et al. |

FOREIGN PATENT DOCUMENTS

| | | |
|---|---|---|
| DE | 43 33 471 | 6/1994 |
| DE | 195 20 130 | 12/1996 |
| EP | 0218932 | 4/1987 |
| EP | 0 218 932 B1 | 3/1989 |
| EP | 0 724 085 | 7/1996 |
| EP | 1301719 B1 | 3/2005 |
| FR | 2226031 | 10/1974 |
| WO | WO 94/21928 | 9/1994 |
| WO | WO 96/38675 | 5/1996 |
| WO | WO 02/08615 | 1/2002 |

* cited by examiner

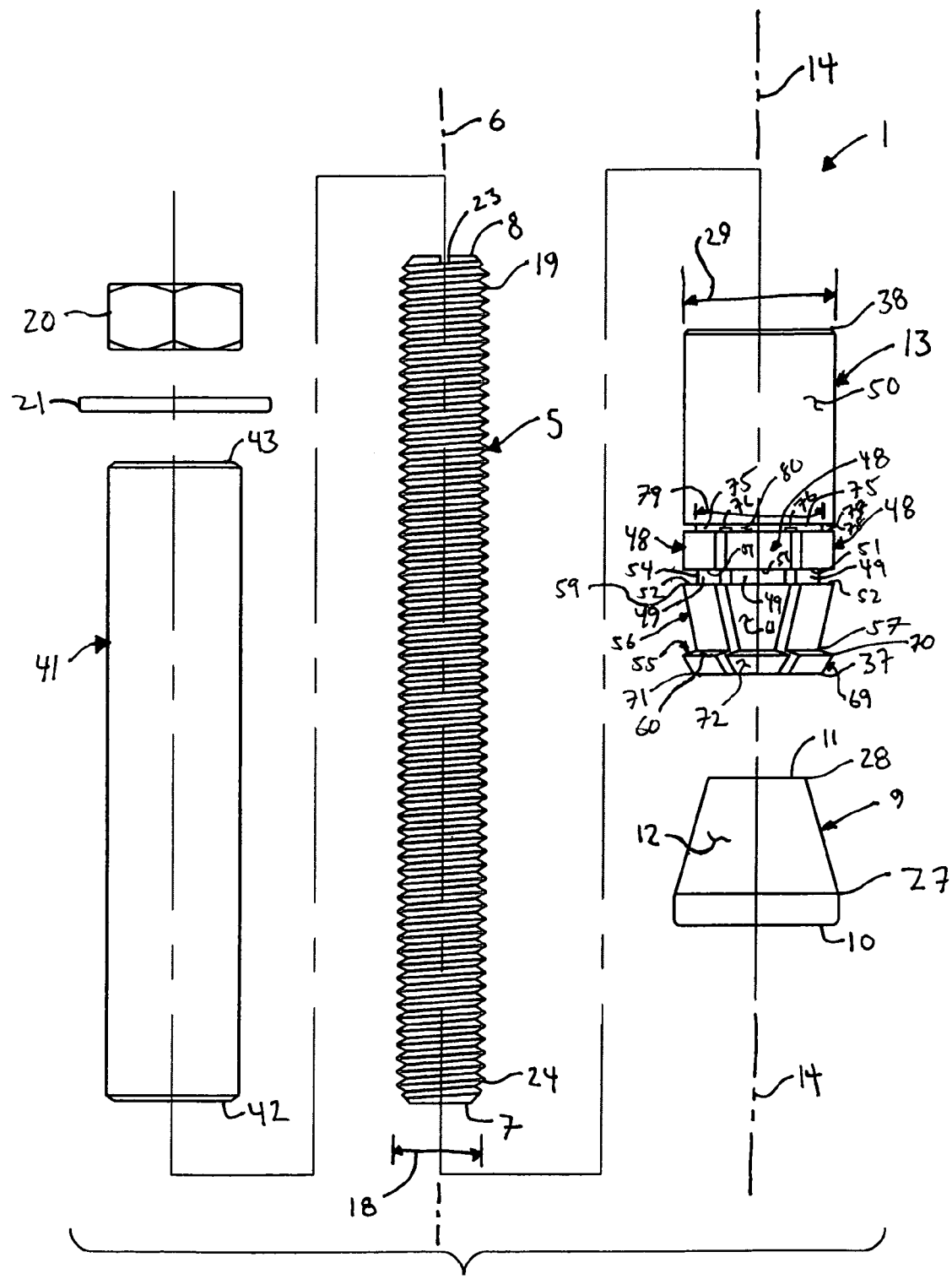
FIG._1

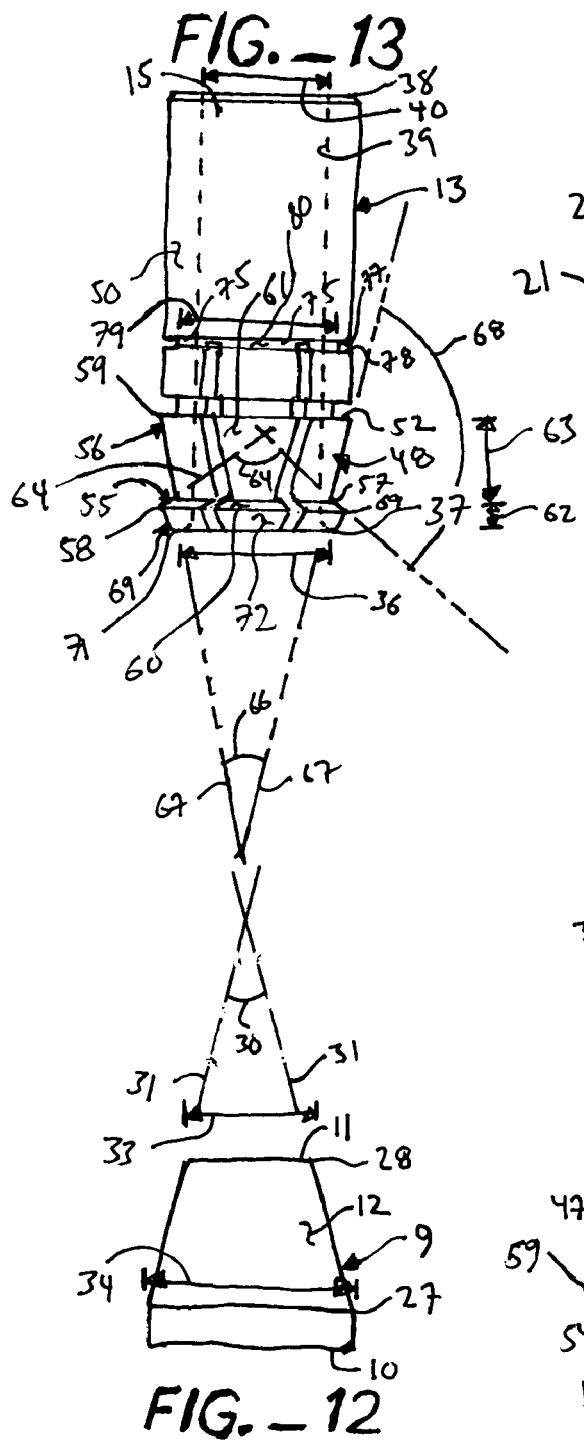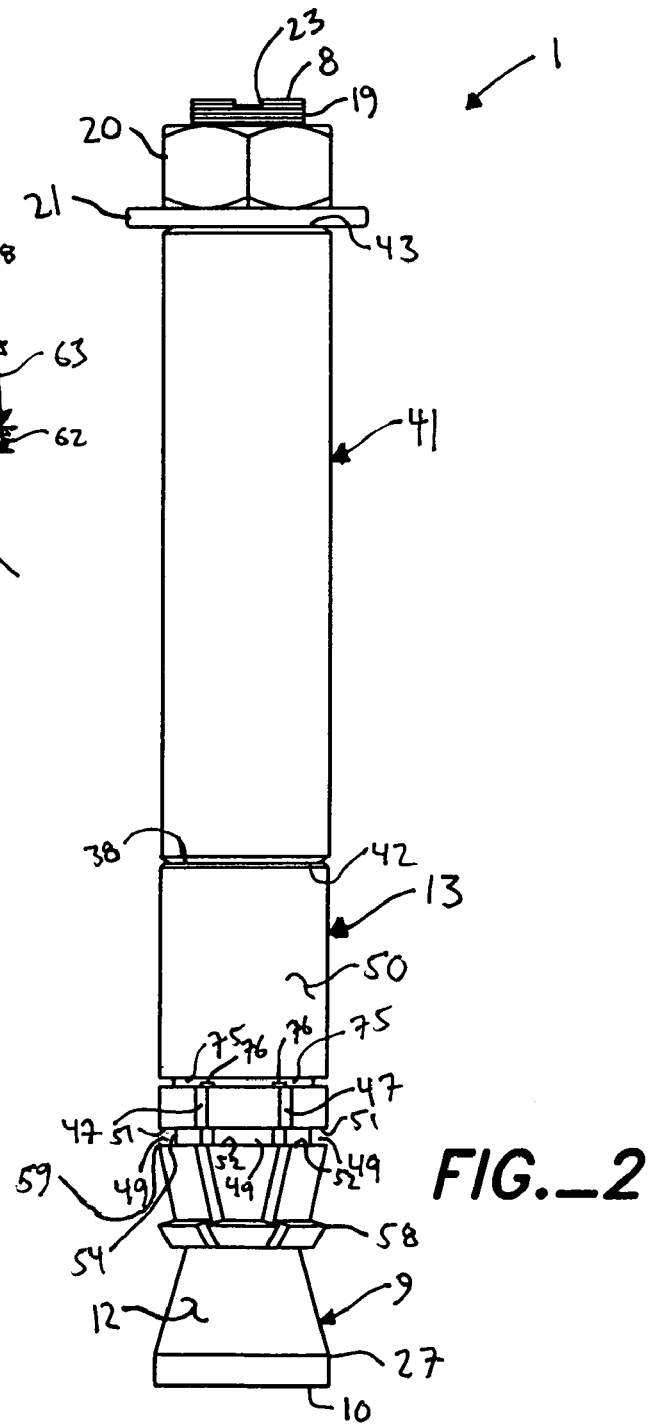

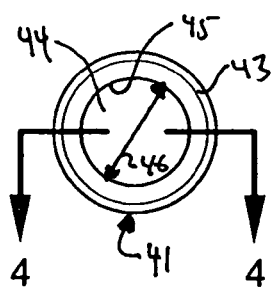
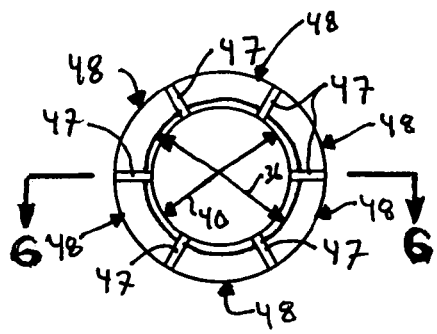
FIG._3  FIG._5
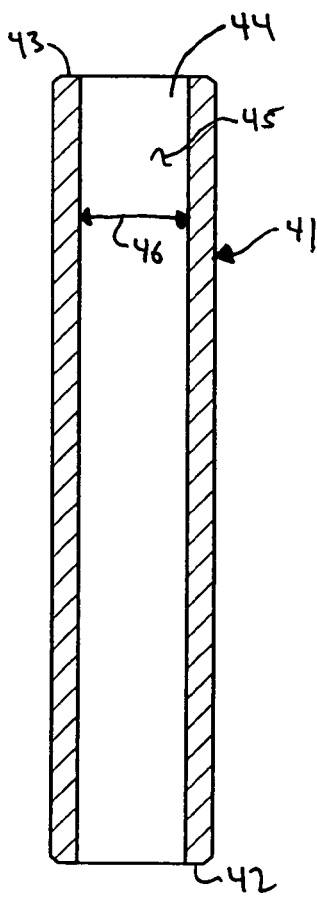
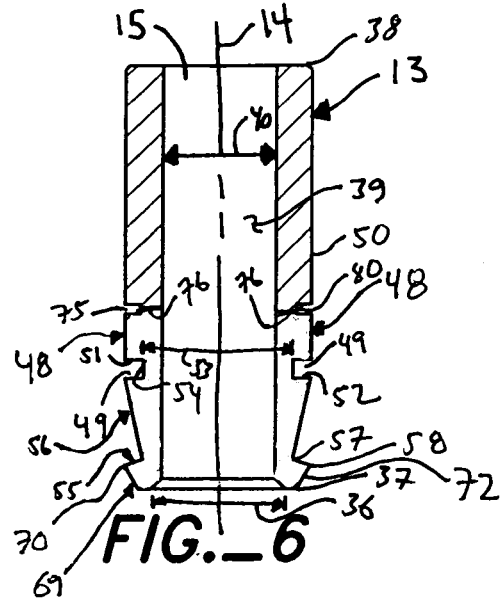
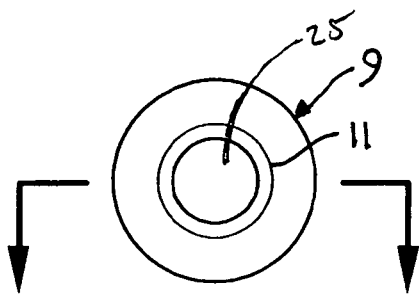
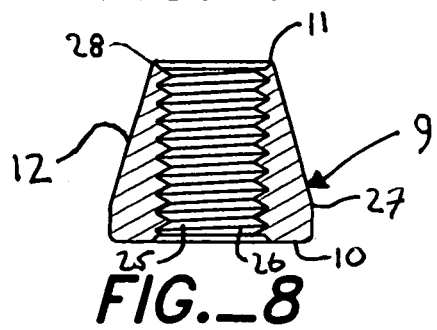
FIG._4  FIG._6  FIG._7  FIG._8

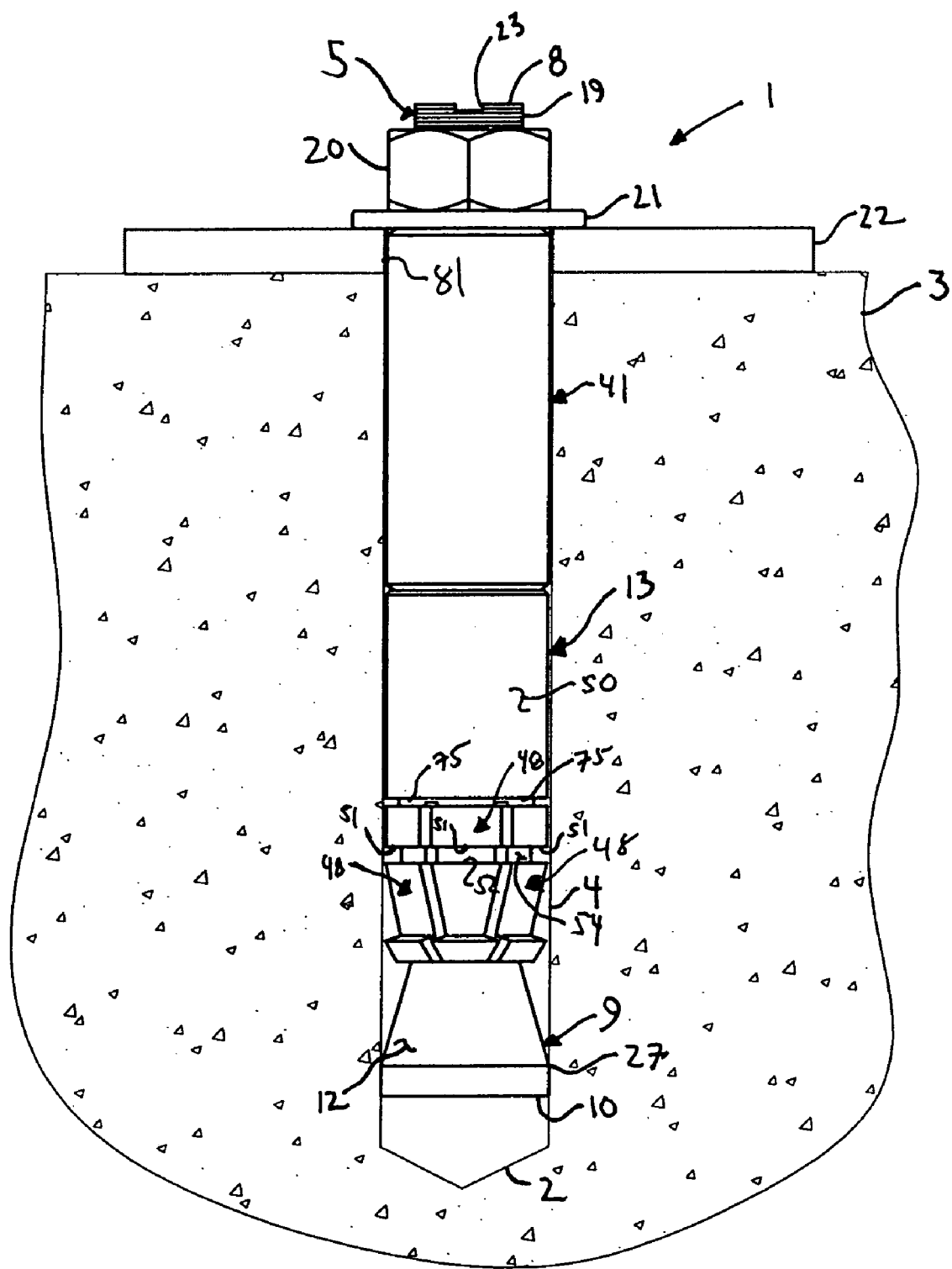
FIG._9

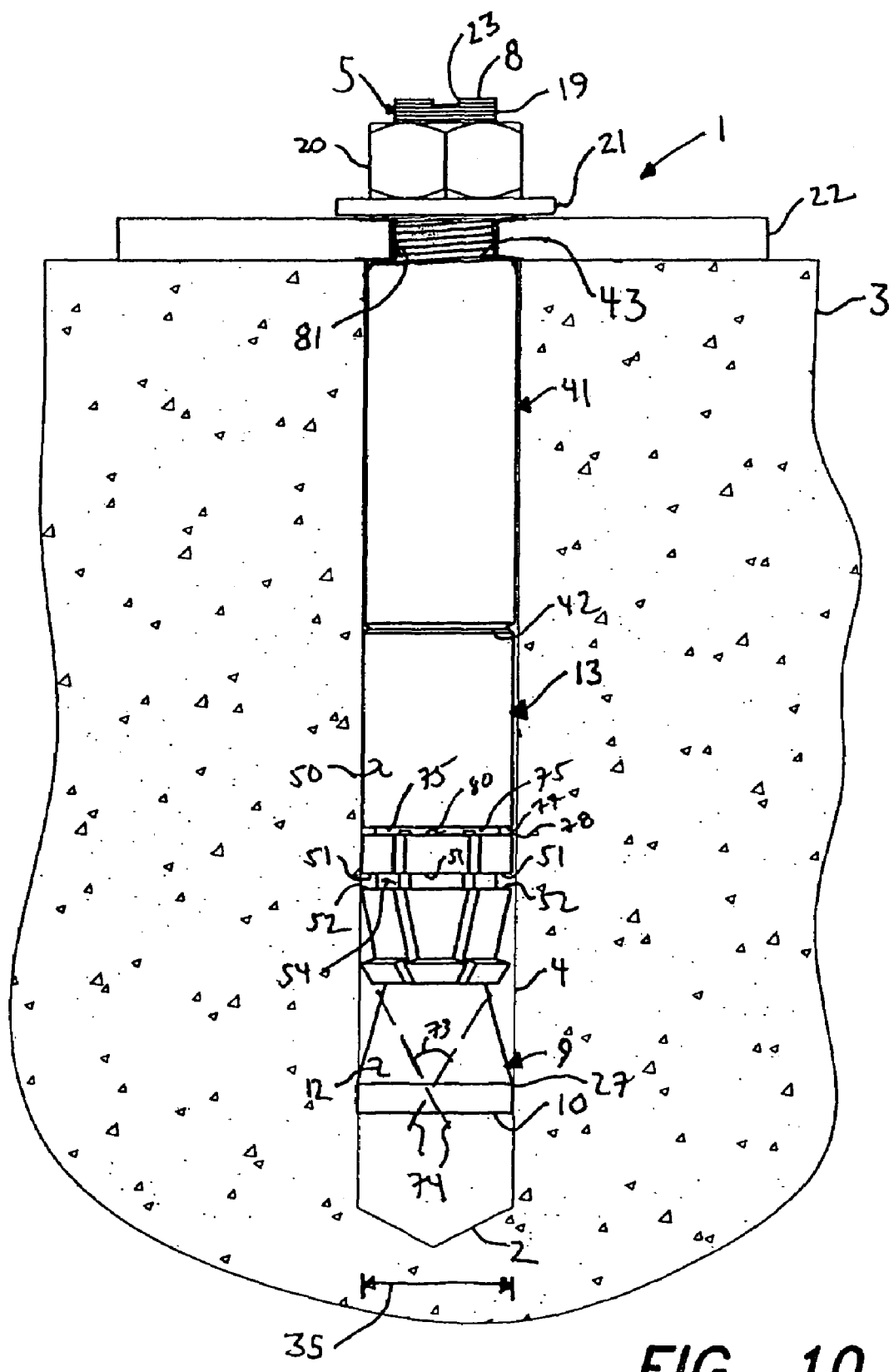
FIG._10

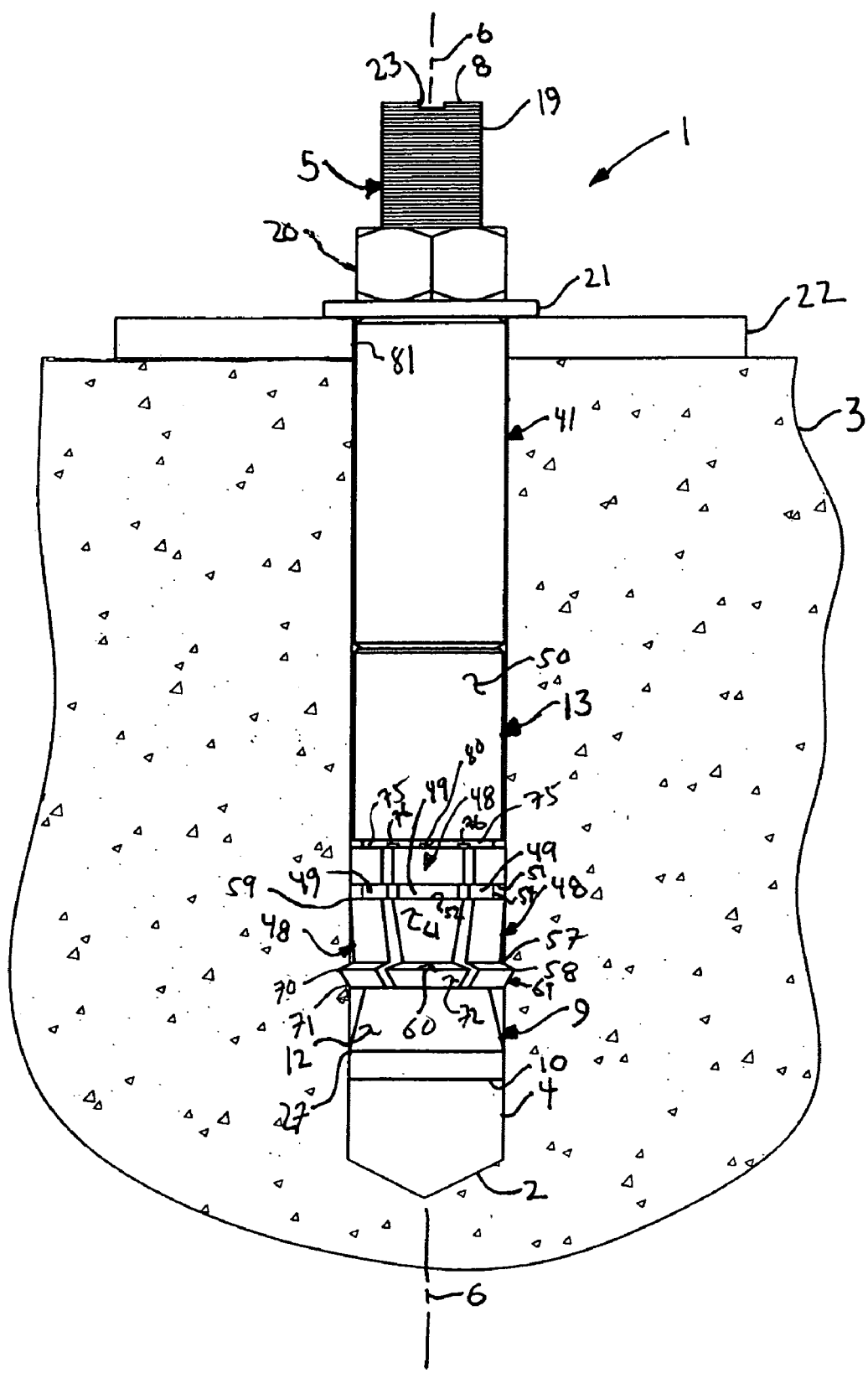
FIG._11

US 7,357,613 B2

EXPANSION ANCHOR WITH CRACK-ARRESTING GROOVE

BACKGROUND OF THE INVENTION

This invention relates to setting anchors in masonry or other cementious medium, and more particularly to an anchor that is set in a bore in a cementious member and makes a mechanical connection with the cementious member by cutting into the wall of the bore.

The prior art teaches a number of anchors where the anchor is formed with a stem surrounded by a sleeve, the stem and sleeve being formed so that the stem can be moved in an axial direction with respect to the sleeve, and as the stem slides through the sleeve, ramped surfaces on the stem cause the elongate arms of the sleeve to expand.

If the elongate arms are formed with cutting surfaces that are meant to penetrate into the side wall of the bore as the sleeve expands, then the anchors are said to work by positive engagement rather than by frictional engagement. These anchors, using positive engagement, are believed to secure the anchor in place without causing large radial forces on the sidewall of the bore.

It is believed that friction anchors which do not have cutting edges on the elongate arms and have large surfaces that press against the bore as the sleeve expands subject the sidewall to large radial forces, and thus the material in which the anchor is set must be very strong, such as high strength concrete and strong mineral formations. Further, the bore must be deep enough and the anchor set far enough into the bore that the point where the anchor frictionally engages the sidewall is far removed from the face of the concrete or rock in which the bore is made, to prevent the bursting of the concrete that makes up the sidewall of the bore.

The anchors described above that use positive engagement are more akin to traditional undercut anchors. Traditional undercut anchors are special anchors that are fitted in bores that have special undercuts at their ends, made with a special tool, and the anchor has a flange or shoulder that can be extended to grab the lip of the undercut. In effect, anchors that use positive engagement cut their own lip, on which the cutting edge then hangs, and if only the cutting edge makes contact with the sidewall of the bore, the radial forces on the bore should be localized and limited, because the cutting edge will have cut its way into the sidewall, removing material as it went. Anchors that work by positive engagement with cutting surfaces that are meant to penetrate into the side wall of the bore as the sleeve expands are often called self-undercutting anchors.

The present invention represents an improved positive engagement anchor.

BRIEF SUMMARY OF THE INVENTION

It is an object of the present invention to provide a high capacity, positive engagement anchor that creates only localized and limited radial forces on the side wall of the bore in which it is placed.

It is an object of the present invention to provide a positive engagement anchor that has a sleeve with anchoring segments formed in the sleeve that having cutting surfaces that cut into the side wall of the bore into which the anchor is inserted.

It is a further object of the present invention to provide a positive engagement anchor where the sleeve is provided with a first groove near the trailing end of the anchor segments that weakens the sleeve and facilitates the outward displacement of the anchor segments.

It is a further object of the present invention to provide a positive engagement anchor where the sleeve is provided with a second groove at the trailing end of the anchor segments that serves to prevent that slots that define the anchor segments from extending further toward the trailing end of the sleeve when the anchor is loaded.

BRIEF DESCRIPTION OF THE SEVERAL VIEWS OF THE DRAWING

FIG. 1 is a perspective exploded diagram of the present invention.

FIG. 2 is a side view of an anchor. The anchor is shown in its initial position for introduction into a bore.

FIG. 3 it a top view of the spacer sleeve shown in FIG. 1.

FIG. 4 is a cross-sectional side view of the spacer sleeve of FIG. 3 taken along line 4-4.

FIG. 5 is a bottom view of the expansion sleeve shown in FIG. 1.

FIG. 6 is a cross-sectional side view of the expansion sleeve of FIG. 5 taken along line 6-6.

FIG. 7 is a top view of the tensioning head shown in FIG. 1.

FIG. 8 is a cross-sectional side view of the tensioning head of FIG. 8, taken along line 8-8.

FIG. 9 is a side view of an anchor shown inserted into a bore in a cementious member. The anchor is shown in its initial position after being inserted into the bore.

FIG. 10 is a side view of an anchor shown inserted into a bore in a cementious member. The anchor is shown in its initial position after being inserted into the bore.

FIG. 11 is a side view of an anchor shown inserted into a bore in a cementious member. The anchor is shown engaging the side wall of the bore, after the stem has been withdrawn from the opening causing the cutting edges of the anchor segments to bite into the side wall of the bore.

FIG. 12 is a side view of the tensioning head of the present invention.

FIG. 13 is a side view of the expansion sleeve of the present invention.

DETAILED DESCRIPTION OF THE INVENTION

As shown in FIG. 11, an anchor 1 is provided that is inserted into a bore 2 in a cementious member 3, the bore having a side wall 4.

As shown in FIG. 1, the anchor 1 is made up of an elongated stem 5 having a longitudinal axis 6 and a leading end 7 and a trailing end 8. A tensioning head 9 is disposed at the leading end 7 of the stem 5 and connected to the leading end 7 of the stem 5 in such a manner that when the stem 5 is moved along its longitudinal axis 6 the tensioning head 9 moves with the stem 5. The tensioning head 9 also has a leading end 10, a trailing end 11 and an outer surface 12, the leading end 10 of the tensioning head 9 being wider than the trailing end 11 of the tensioning head 9 and the outer surface 12 of the tensioning head 9 flaring generally outwardly from the trailing end 11 to the leading end 10 of the tensioning head 9.

As is further shown in FIGS. 1 and 13, the anchor 1 is also provided with an expansion sleeve 13 having a longitudinal axis 14 parallel to the longitudinal axis 6 of the elongated stem 5, the expansion sleeve 13 receiving the stem 5 through a tunnel 15 in the expansion sleeve 13 in such a manner that the stem 5 can move longitudinally with respect to the expansion sleeve 13 when the expansion sleeve 13 is held in a fixed position.

As is best shown in FIG. 1, in the preferred embodiment, the stem 5 is formed as an elongate cylinder having a leading end 7 and a following end or trailing end 8. The cylindrical stem 5 has a substantially uniform outside diameter 18 with no large differences in the outside diameter 18 of the shank between different portions of the stem 5, although such differences in the diameter of the stem 5 are possible.

In the preferred embodiment, the trailing end 8 of the stem 5 is formed with a thread 19 that can receive a nut 20 and a washer 21 as well as one or more additional members 22.

The trailing end 8 of the stem 5 can also be formed with a head that can receive a tool that can apply torque to the stem 5 such as a hex head wrench. In the preferred embodiment, the trailing end 8 is formed with a slot 23 to receive a screw driver.

As is best shown in FIG. 1, in the preferred form of the invention, like the trailing end 8 of the stem 5, the leading end 7 of the stem 5 is also formed with a thread 24, and in fact, in the preferred embodiment, the stem 5 is all thread rod of ASTM A193 Grade B7, having a maximum core hardness of HRC35. The stem 5 is preferably zinc plated—ASTM B633 SC1—and the plating has a minimum thickness of 0.0002 inches. Preferably, the thread 19 and 24 is a class 2A UNC thread.

Preferably, the stem 5 is at least 6 inches long and commercial embodiments are contemplated that will be as long as 16.25 inches.

As is best shown in FIGS. 1, 2 and 8, in the preferred embodiment, the thread 24 at the leading end 7 is used to receive a frustoconically, flaring tensioning member or head 9. The tensioning member 9 has an internal bore 25 with an internal thread 26 that can be threaded onto the leading end 7 of the stem 5. The flaring tension member 9 is threaded onto the stem 5 so that the larger base 27 of the frustoconical tensioning member 9 is disposed toward the leading end 7 of the stem 5, and the smaller end 28 of the frustoconical tensioning head 9 is disposed toward the trailing end 8 of the stem 5.

As is best shown in FIG. 2, in the preferred embodiment, the smaller end 28 of the frustoconical tensioning member 9 coincides with the trailing end 11 of the tensioning member 9.

In the preferred embodiment, the tensioning member 9 is 0.538 inches long when used with an expansion sleeve 13 having a maximum outside diameter 29 (see FIG. 1) in its initial unexpanded form of 0.625 inches and is 1.023 inches long when used with an expansion sleeve 13 having a maximum outside diameter 29 in its initial unexpanded form of 1.250 inches. All further references to the maximum outside diameter 29 of the expansion sleeve are to the diameter of the sleeve before it is has been expanded by the operation of the tensioning head 9.

As is best shown in FIG. 12, In the preferred embodiment, the frustoconical tensioning head 9 is a regular truncated cone with a linear sloping surface and the cone angle 30 formed by diametrically opposite generating lines 31 of the outer boundary surface 12 of the frustoconical tensioning head 9 is rather small, preferably as small as 32 degrees.

In the preferred embodiment, the smaller end 28 of the frustoconical tensioning member 9 has an external diameter 33 (see FIG. 12) of 0.420 inches when the outside diameter 29 of the expansion sleeve 13 is 0.625 inches and it has an external diameter 33 of 0.825 inches when the outside diameter 29 of the expansion sleeve 13 is 1.250 inches.

In the preferred embodiment, the larger base 27 of the frustoconical tensioning member 9 has an external diameter 34 (see FIG. 12) of 0.660 inches when the maximum outside diameter 29 of the expansion sleeve 13 is 0.625 inches and it has an external diameter 34 of 1.280 inches when the maximum outside diameter 29 of the expansion sleeve 13 is 1.250 inches.

As such, in the preferred embodiment, the external diameter 34 of the larger base 27 of the frustoconical tensioning member 9 is larger than the maximum outsider diameter 29 of the corresponding expansion sleeve 13 with which it is used. See FIGS. 2 and 10. Furthermore, in the preferred embodiment, the outer boundary surface 12 of the frustoconical tensioning head 9 flares gradually outwardly as it approaches the larger base 27 of the frustoconical tensioning member 9 from the smaller end 28 of the frustoconical tensioning member 9. In this manner, as the tensioning member 9 is drawn into the expansion sleeve 13 it can impose outward pressure on the expansion sleeve 13 to its external diameter 34. Since the external diameter 34 of the larger base 27 of the frustoconical member 9 is larger than the corresponding maximum outer or external diameter 29 of the expansion sleeve 13, high pressures can be placed on the expansion sleeve 13 by the tensioning member 9 when the diameter 35 (see FIG. 10) of the bore 2 is substantially similar to the maximum outside diameter 29 of the expansion sleeve 13.

As shown in FIG. 13, in the preferred embodiment, the expansion sleeve 13 has a maximum external diameter 29 and a selected internal diameter 36 of the tunnel 15 at the leading end 37 of the expansion sleeve 13, and the tensioning head 9 has a maximum outer diameter 34 that is larger than the maximum external diameter 19 of the expansion sleeve 13, and the outer surface 12 of the tensioning head 9 is shaped so that the diameter of the tensioning head 9 gradually increases from a diameter that is approximately equal to the internal diameter 36 of the expansion sleeve 13 at its leading end 37 to a diameter that is larger than the maximum external diameter 19 of the expansion sleeve 13.

As is best shown in FIG. 8, in the preferred embodiment, the larger base 27 of the frustoconical tensioning member 9 is removed from the leading end 10 of the tensioning head 9. In the preferred embodiment, this distance is 0.120 inches for use with an expansion sleeve 13 having a maximum outer diameter 29 of 0.625 inches and this distance is 0.230 inches for use with an expansion sleeve 13 having a maximum outer diameter 29 of 1.250 inches.

The tensioning member 9 is preferably made from SAE J403 Grade Steel. It is zinc plated with commercial grade zinc, the zing plating having a minimum thickness of 0.00015 inches. The tensioning head 9 also has a coating of low friction lubricant with an approximate coefficient of friction of 0.14 to 0.18 to a thickness between 0.0004 and 0.0007 inches.

In the preferred embodiment, after the tensioning head 9 is threaded onto the stem 5, the leading end 7 of the stem 5 is not deformed or manipulated. This allows the tensioning head 9 to be unthreaded from the stem 5 and removed off of the leading end 7 of the stem 5, if desired. However, in general operation, when the stem 5 is withdrawn from the bore 2, the tensioning head 9 moves toward the trailing end 38 (see FIG. 6) of the expansion sleeve 13 with the stem 5. Preferably, the tensioning head 9 has a maximum outer diameter 34 that substantially corresponds or is just slightly smaller than the diameter of the bore 35.

There are many different ways of providing the stem 5 with a tensioning head 9, including forming the tensioning 9 head from the body of the stem 5.

As is shown in FIGS. 1 and 6, in the preferred embodiment, the stem 5 is received within the expansion sleeve 13. The expansion sleeve is formed with a leading end 37 and a trailing end 38. In the preferred embodiment, the expansion sleeve 13 is formed with a cylindrical longitudinal tunnel 15 that can receive at least a portion of the stem 5. The cylindrical tunnel 15 has an inner wall 39 (see FIG. 6). In the preferred embodiment, the cylindrical tunnel has a substantially uniform inside diameter 40 (see FIG. 6) that is substantially equal to or somewhat larger than the uniform outer diameter of the cylindrical stem 5 received in the expansion sleeve 13 when the anchor 1 is in its initial position and the tensioning head 9 has not been drawn into the sleeve 13.

In the preferred embodiment, the uniform inside diameter 40 of the expansion sleeve 13 is 0.390 inches when the expansion sleeve 13 has a maximum outer diameter 29 of 0.625 inches and 0.766 inches when the expansion sleeve 13 has a maximum outer diameter 19 of 1.250 inches.

As shown in FIG. 2, the stem 5 can slide axially with respect to the sleeve 13. In the preferred embodiment, the leading end 7 of the stem protrudes from the sleeve 13 prior to the insertion of the anchor 1 into the bore 2 in the cementious member 3, but the expansion sleeve 13 and the stem 5 are arranged with respect to each other such that if the stem 5 is withdrawn from the bore 2 while the expansion sleeve 13 remains fixed with respect to the side wall 4 of the bore 2, the tensioning member 9 will make contact with the inner wall 39 of the expansion sleeve 13 , forcing the expansion sleeve 13 to deform.

As shown in FIGS. 1 and 2, in the preferred embodiment, the sleeve 13 is much shorter than the stem 5 and is used in conjunction with a spacer sleeve 41.

As shown in FIGS. 1, 2 and 4, the spacer sleeve 41 has a leading end 42 and a trailing end 43. In the preferred embodiment, the leading end 42 of the spacer sleeve 41 abuts the trailing end 38 of the expansion sleeve 13. As shown in FIG. 11, in the preferred embodiment, the trailing end 43 of the spacer sleeve 41 will protrude from the bore 2 in the cementious member 3 when the anchor 1 is set in the bore 2 to an appropriate depth. In this way the installer can push on the trailing end 43 of the spacer sleeve 41 and thereby push on the trailing end 38 of the expansion sleeve 13 to hold the expansion sleeve 13 in place with respect to its depth in the bore 2, while the stem 5 is extracted from the bore 2.

In the preferred embodiment, the spacer sleeve 41 is formed with a cylindrical longitudinal tunnel 44 that can receive at least a portion of the stem 5. The cylindrical tunnel 44 has an inner wall 45. In the preferred embodiment, the inside diameter 46 of the spacer sleeve 41 is substantially equal to or somewhat larger than the uniform outside diameter 18 of the portion of the cylindrical stem 5 received in the spacer sleeve 41 when the anchor 1 is in its initial position and the tensioning head 9 has not been drawn into the sleeve 13.

In the preferred embodiment, as discussed above, the stem 5 is an elongate cylindrical member having a generally constant outer diameter 18, and so the inside diameter 46 of the spacer sleeve 41 corresponds to the inside diameter 40 of the expansion sleeve 13.

In the preferred embodiment, the spacer sleeve 41 is made from SAE J403 Grade 1045 steel seamless round mechanical tubing that is finished with zinc plating, ASTM B633 Grade SCI 0.0002" minimum thickness. The zinc plating is preferably baked for 6 hours at 400 to 425 degrees Fahrenheit within 1 hour of plating.

As noted above, the expansion sleeve 13 has a leading end 37 and a trailing end 38 with respect to the insertion of the sleeve 13 into the bore 2. In the preferred embodiment the expansion sleeve 13 is 1.271 inches long for an expansion sleeve 13 having a maximum outside diameter 29 of 0.625 inches and 2.878 inches long for an expansion sleeve 13 having a maximum outside diameter 29 of 1.250 inches.

As shown in FIGS. 1 and 5, in the preferred embodiment, a plurality of slots 47 are formed in the leading end 37 of the expansion sleeve 13 that axially extend along the expansion sleeve 13 from the expansion sleeve's leading end 13 toward the trailing end 38, but do not extend all the way to the trailing end 38.

In the preferred embodiment, the portions of the expansion sleeve 13 that are separated from each other by the slots 47 in the expansion sleeve 13 are called anchoring segments 48. Because of the presence of the slots 47 in the sleeve 13, that create the anchoring segments 48, the anchoring segments 48, and the expansion sleeve 13 thereby, is better able to be deflected outwardly by the tensioning head 9, if the stem 5 is withdrawn from the bore 2 under a tensioning force while the expansion sleeve 13 remains fixed with respect to the side wall 4 of the bore 2, causing the tensioning member 9 to make contact with the internal wall 39 of the expansion sleeve 13 and push upon the anchoring segments 48.

As shown in FIG. 5, in the preferred embodiment, the slots 47 are spaced at equal angles around the circumference of the expansion sleeve 13, and six slots 47 are made in the expansion sleeve 13, creating six anchor segments 48.

In the preferred embodiment the slots 47 are 0.047 inches wide for an expansion sleeve 13 having a maximum outer diameter 29 of 0.625 inches and 0.063 inches wide for an expansion sleeve 13 having a maximum outer diameter 29 of 1.250 inches.

As shown in FIG. 1, in the preferred embodiment, a first weakening groove 49 is formed in each of the anchoring segments 48, and furthermore in the preferred embodiment, the first weakening groves 49 are provided on the outer surface 50 of the expansion sleeve 13 and the first weakening grooves 49 are formed on a single circumference at a selected distance from the leading end 37 of the sleeve 13 and are countersunk in the outer surface 50. These first grooves 49 make up a single weakening groove, and when the tensioning member 9 makes contact with the internal wall 39 of the sleeve 13 and pushes on the anchoring segments 48, it is intended that deformation of the material of the sleeve 13 to allow the deflection of the anchoring segments 48 primarily occurs here.

In the preferred embodiment, the distance between the trailing end side wall 51 of the first countersunk grooves 49 and the leading end 37 of the sleeve is 0.542 inches for an expansion sleeve 13 having a maximum outer diameter 29 of 0.625 inches and 0.882 inches for an expansion sleeve 13 having a maximum outer diameter 29 of 1.25 inches.

In the preferred embodiment, the distance between the leading end side walls 52 and the trailing end side walls 51 of the first countersunk grooves 49 is 0.063 inches for an expansion sleeve 13 having a maximum outer diameter 29 of 0.625 inches and 0.125 inches for an expansion sleeve 13 having a maximum outer diameter 29 of 1.25 inches.

The outer diameter 53 (see FIG. 6) of the expansion sleeve 13 at the base 54 of the first countersunk, circumferential grooves 49 is 0.475 inches for an expansion sleeve 13 having a maximum outer diameter of 0.625 inches and 1.007 inches for an expansion sleeve 13 having a maximum outer diameter 29 of 1.250 inches.

As shown in FIGS. 1, 6 and 13, in the preferred embodiment, the anchoring segments 48 are shaped, so that if their form is considered as a whole and the presence of the slots 47 is not considered, the anchoring segments 48 have an outer shape of a pair of frustoconical members 55 and 56, abutting against each other at their end faces of smaller diameter 57. The base face 58 of the frustoconical member 55 at the leading end 37 of the sleeve 13 ends at or near the leading end 37 of the sleeve 13, and the base face 59 of the frustoconical member 56 at the trailing end 38 of the sleeve 13 ends at the first countersunk circumferential grooves 49.

In the preferred embodiment, the outside diameter of the sleeve at the base faces 58 and 59—the larger faces—of the paired frustonical segments or members 55 and 56 approaches or is equal to the maximum outside diameter 29 of the sleeve 13, prior to deflection of the anchoring segments 48.

In the preferred embodiment, the outer surface 60 of the leading fustoconical member 55 serves as a cutting edge that can be driven into the side wall 4 of the bore 2.

As shown in FIG. 13, in the preferred embodiment, the length in the axial or longitudinal direction of the anchor 1 of the outer surface 60 of the leading frustoconical member 55 (the first distance 62) is much shorter than the length of the outer surface 61 of the trailing frustoconical member 56 (the second distance 63), and the cone angle 64 formed by diametrically opposite generating lines 65 of the outer boundary surface 60 of the leading frustoconical member 55 is very large, preferably as large as 140 degrees, so that the leading frustoconical outer surface 60 is driven in at a very steep angle into the sidewall 4 of the bore 2, so that it is more likely to cut into the bore 2 rather than just press against it.

In comparison, the cone angle 66 formed by diametrically opposite generating lines 67 of the outer boundary surface 61 of the trailing frustoconical member 56 is very small, preferably as small as 24 degrees.

Preferably, the angles 68 between the intersection of the generating lines 65 and 67 of the outer boundary surfaces 60 and 61 of the leading frustoconical member 55 and the trailing frustoconical member 56 is 96 to 98 degrees. This intersection 68 occurs where the leading and the trailing frustoconical members 55 and 56 abut against each other at their end faces of smaller diameter 57.

In the preferred embodiment, the base 58 of the leading frustoconical member 55 is not the end of the leading end 37 of the sleeve 13. In fact, the distance between the base 58 of the leading frustocinal member 55 and the leading end 37 of the expansion sleeve 13 is 0.090 inches for an expansion sleeve 13 having a maximum outer diameter 29 of 0.625 inches and 0.155 inches for an expansion sleeve 13 having a maximum outer diameter 29 of 1.250 inches.

As shown in FIGS. 1 and 2, in the preferred embodiment, the leading end 37 of the sleeve 13 is cut away from the outer diameter of the base 58 of the leading frustoconical member 55 to make a better cutting edge. In the preferred embodiment, the anchoring segments 48 have one more frustoconical member, called the cutting frustoconical member 69 that has its larger base 70 equal to the larger base 58 of the leading frustoconical member 55 and has its smaller end 71 at the leading end 37 of the sleeve 13.

In the preferred embodiment, the outer surface 72 of the cutting frustoconical member 69 is very short, although not as short as outer surface 60 the leading frustoconical member 55.

As shown in FIG. 10, in the preferred embodiment, the cone angle 73 formed by diametrically opposite generating lines 74 of the outer boundary surface 72 of the cutting frustoconical member 69 is 60 degrees, so that the leading frustoconical member's outer surface 60 and the cutting frustoconical member's outer surface 72 meet at a sharp edge.

In the preferred embodiment the end diameter at the leading end 37 of the sleeve 13 is 0.516 inches for an expansion sleeve 13 having a maximum outer diameter of 0.625 inches and 1.066 for an expansion sleeve 13 having a maximum outer diameter 29 of 1.250 inches.

As shown in FIGS. 1, 2 and 6, in the preferred form of the invention, the slots 47 forming the anchoring segments 48 extend from the leading end 37 of the sleeve 13, through the first countersunk circumferential grooves 49, to second grooves 75 formed in the expansion sleeve 13 at the ends 76 of each of the slots 47 or between the ends 76 of each of the slots 47 and the trailing end 38 of the expansion sleeve 13.

In the preferred embodiment, the second grooves 75 are joined together as a single second countersunk circumferential groove disposed closer to the trailing end 38 of the sleeve 13 than the first countersunk groove 49. In the preferred embodiment, the distance between trailing end side wall 51 of the first counter sunk groove 49 and the trailing end side wall 77 of the second countersunk groove 75 is 0.188 inches for an expansion sleeve 13 having a maximum outer diameter 29 of 0.625 inches and 0.375 inches for an expansion sleeve 13 having a maximum outer diameter 29 of 1.25 inches.

In the preferred embodiment, the distance between the leading end side wall 78 and trailing end side wall 77 of the second countersunk groove 75 is 0.047 inches for an expansion sleeve 13 having a maximum outer diameter 29 of 0.625 inches and 0.063 inches for an expansion sleeve 13 having a maximum outer diameter 29 of 1.25 inches.

The outer diameter 79 of the expansion sleeve 13 at the base 80 of the second countersunk, circumferential groove 75 is 0.525 inches for an expansion sleeve 13 having a maximum outer diameter 29 of 0.625 inches and 1.047 inches for an expansion sleeve 13 having a maximum outer diameter 29 of 1.250 inches. In the preferred embodiment, the depth of the second groove or grooves is less than the depth of the first groove or grooves, so that bending is more likely to take place at the first groove.

According to the present invention, the slots 47 end at or before the second countersunk circumferential groove 75, and preferably they end in the groove, 75 specifically before they reach the trailing end side wall 77 of the second countersunk circumferential groove 75.

The expansion sleeve 13 is preferably made from SAE J403 Grade steel. It is finished with zinc plating of a grade of ASTM B633 SCI 0.0002" minimum thickness that has been baked for 6 hours at 400 to 425 degrees Fahrenheit within 1 hour of plating. The expansion sleeve 13 is hardened to HRC 30-34. In the preferred embodiment, the features of the expansion sleeve 13, including the slots 47 and the circumferential grooves 49 and 75 are machined formed in the steel.

As shown in FIGS. 9 and 11, in one manner of use, a bore 2 is drilled into the cementious or masonry member 3 to a selected depth so that the anchor 1 can be received a selected distance into the bore 2. The bore 2 is drilled through the member 22 that will be attached to the masonry member 3, the opening 81 in the member 22 aligning with the bore 2. The bore 2 is then cleaned. The anchor 1 is then inserted through the opening 81 in the member 22 and into the bore 2 with the leading end 7 of the stem 5 being inserted first. Since, the tensioning head 9 has a maximum outer diameter 34 that substantially corresponds to or is just slightly smaller than the diameter of the bore 35, the anchor 1 is tapped into the hole. Friction between the tensioning head 9 and the side wall 4 of the bore 2 prevents the tensioning head 9 from spinning during the setting operation.

In the preferred embodiment, if a washer 21 is not already fitted over the trailing end 8 of the stem 5, it is inserted over the stem 5 and pressed against the spacer sleeve 41. In the preferred embodiment, if a nut 20 has not already been threaded onto the stem 5, a nut 20 is screwed onto the trailing end 8 of the stem 8 until it reaches the washer 21. Further threading of the nut 20 onto the stem 5, draws the stem 5 through the expansion sleeve 13 and the spacer sleeve 41 and with it the tensioning head 9. The frustoconical outer surface 12 of the tensioning head 9 comes into contact with the inner wall 39 of the expansion sleeve 13 at the anchoring segments 48, and because of its flaring shape, the farther the tensioning head 9 is drawn into the expansion sleeve 13, the further it pushes the anchoring segments 48 outwardly. As the anchoring segments 48 are pushed outwardly, the outer surfaces 60 and 72 of the leading and cutting frustoconical members 55 and 69 are driven or cut into the side wall 4 of the bore 2, creating a positive engagement with the cementitious member 3. Preferably, the nut 20 is preferably turned with a torque wrench to a prescribed torque, so the installer has some indication that the tensioning head 9 has been drawn into the expansion sleeve 13 sufficiently.

We claim:

1. An anchor comprising:
   a. an elongated stem having a longitudinal axis and a leading end and a trailing end;
   b. a tensioning head disposed at the leading end of the stem and connected to the leading end of the stem in such a manner that when the stem is moved along its longitudinal axis the tensioning head moves with the stem, the tensioning head having a leading end, a trailing end and an outer surface, the leading end of the tensioning head being wider than the trailing end of the tensioning head and the outer surface of the tensioning head flaring generally outwardly from the trailing end to the leading end of the tensioning head;
   c. an expansion sleeve having a longitudinal axis parallel to the longitudinal axis of the elongated stem, the expansion sleeve receiving the stem through a tunnel in the expansion sleeve in such a manner that the stem can move longitudinally with respect to the expansion sleeve when the expansion sleeve is held in a fixed position, the expansion sleeve further comprising:
      1. a leading end and a trailing end and the expansion sleeve receives the stem in such a manner that the leading end of the expansion sleeve is disposed near the leading end of the stem and the trailing end of the expansion sleeve is closer to the trailing end of the stem than the leading end of the expansion sleeve;
      2. a plurality of longitudinal slots formed in the expansion sleeve that extend from the leading end of the expansion sleeve toward the trailing end of the expansion sleeve and divide the portions of expansion sleeve toward the leading end of the expansion sleeve between the slots into anchoring segments;
      3. a first weakening groove formed in each of the anchoring segments;
      4. second grooves formed in the expansion sleeve at the end of each of the slots or between the ends of each of the slots and the trailing end of the expansion sleeve.

2. The anchor of claim 1, wherein:
   a. the expansion sleeve has a maximum external diameter and a selected internal diameter of the tunnel at the leading end of the expansion sleeve; and
   b. the tensioning head has a maximum outer diameter that is larger than the maximum external diameter of the expansion sleeve, and the outer surface of the tensioning head is shaped so that the diameter of the tensioning head gradually increases from a diameter that is approximately equal to the internal diameter of the expansion sleeve at its leading end to the diameter that is larger than the maximum external diameter of the expansion sleeve.

3. The anchor of claim 2, wherein:
   the tensioning head is shaped as a substantially frustoconical member, the frustoconical member having cone angle defined by diametrically opposite generating lines of the outer boundary surface of the frustoconical tensioning head, the cone angle being approximately 32 degrees.

4. The anchor of claim 3, wherein:
   a. the portion of the expansion sleeve made up of the anchoring segments is shaped, in part, as a pair of frustoconical members, a frustoconical member at the leading end of the sleeve and a frustoconical member at the trailing end of the sleeve, each having smaller end faces and larger base faces, the smaller end faces of the pair of frustoconical members abutting against each other, and the base face of the frustoconical member at the leading end of the sleeve ending at or near the leading end of the sleeve, and the base face of the frustoconical member at the trailing end of the sleeve ending at the first weakening groove formed in each of the anchoring segments;
   b. the fustoconical member at the trailing end of the sleeve has an outer surface between the small end and larger base; and
   c. the fustoconical member at the leading end of the sleeve has an outer surface between the small end and larger base that serves as a cutting edge that can be driven into a side wall of a bore.

5. The anchor of claim 4, wherein:
   a. the expansion sleeve has a maximum external diameter; and
   b. the larger base faces of the pair of frustonical members each has an outside diameter, and the outside diameter of the pair of frustoconical members approaches or is equal to the maximum external diameter of the expansion sleeve, prior to deflection of the anchoring segments.

6. The anchor of claim 5, wherein:
   a. the smaller end and the larger base of the frustonical member at the leading end of the sleeve define a first distance as measured along the longitudinal axis of the sleeve;
   b. the smaller end and the larger base of the frustonical member at the trailing end of the sleeve define a second distance as measured along the longitudinal axis of the sleeve; and
   c. the first distance of the frustonical member at the leading end of the expansion sleeve is much shorter than the length of the frustoconical member at the trailing end of the expansion sleeve.

7. The anchor of claim 6, wherein:
a. the outer surface of the frustoconical member at the leading end of the sleeve has a cone angle defined by diametrically opposite generating lines of the outer surface of the frustoconical member at the leading end of sleeve, the cone angle being approximately 140 degrees; and
b. the outer surface of the frustoconical member at the trailing end of the sleeve has a cone angle defined by diametrically opposite generating lines of the outer surface of the frustoconical member at the trailing end of sleeve, the cone angle being approximately 24 degrees.

8. The anchor of claim 7, wherein:
the portion of the expansion sleeve made up of the anchoring segments is shaped, in part, as an additional cutting frustoconical member, the cutting frustoconical member having a larger base that coincides with the base face of the frustoconical member at the leading end of the expansion sleeve and the cutting frustoconical member has a smaller end face at the leading end of the expansion sleeve.

9. The anchor of claim 1, wherein:
the tensioning head is shaped as a substantially frustoconical member, the frustoconical member having cone angle defined by diametrically opposite generating lines of the outer boundary surface of the frustoconical tensioning head, the cone angle being approximately 32 degrees.

10. The anchor of claim 1, wherein:
a. the portion of the expansion sleeve made up of the anchoring segments is shaped, in part, as a pair of frustoconical members, a frustoconical member at the leading end of the sleeve and a frustoconical member at the trailing end of the sleeve, each having smaller end faces and larger base faces, the smaller end faces of the pair of frustoconical members abutting against each other, and the base face of the frustoconical member at the leading end of the sleeve ending at or near the leading end of the sleeve, and the base face of the frustoconical member at the trailing end of the sleeve ending at the first weakening groove formed in each of the anchoring segments;
b. the fustoconical member at the trailing end of the sleeve has an outer surface between the small end and larger base; and
c. the fustoconical member at the leading end of the sleeve has an outer surface between the small end and larger base that serves as a cutting edge that can be driven into a side wall of a bore.

11. The anchor of claim 10, wherein:
a. the expansion sleeve has a maximum external diameter prior to deflection of the anchoring segments; and
b. the larger base faces of the pair of frustonical members each has an outside diameter, and the outside diameter of the pair of frustoconical members approaches or is equal to the maximum external diameter of the expansion sleeve, prior to deflection of the anchoring segments.

12. The anchor of claim 10, wherein:
a. the smaller end and the larger base of the frustonical member at the leading end of the sleeve define a first distance as measured along the longitudinal axis of the sleeve;
b. the smaller end and the larger base of the frustonical member at the trailing end of the sleeve define a second distance as measured along the longitudinal axis of the sleeve; and
c. the first distance of the frustoconical member at the leading end of the expansion sleeve is much shorter than the length of the frustoconical member at the trailing end of the expansion sleeve.

13. The anchor of claim 10, wherein:
a. the outer surface of the frustoconical member at the leading end of the sleeve has a cone angle defined by diametrically opposite generating lines of the outer surface of the frustoconical member at the leading end of sleeve, the cone angle being approximately 140 degrees; and
b. the outer surface of the frustoconical member at the trailing end of the sleeve has a cone angle defined by diametrically opposite generating lines of the outer surface of the frustoconical member at the trailing end of sleeve, the cone angle being approximately 24 degrees.

14. The anchor of claim 10, wherein:
the portion of the expansion sleeve made up of the anchoring segments is shaped, in part, as an additional cutting frustoconical member, the cutting frustoconical member having a larger base that coincides with the base face of the frustoconical member at the leading end of the expansion sleeve and the cutting frustoconical member has a smaller end face at the leading end of the expansion sleeve.

* * * * *